United States Patent Office 2,977,251
Patented Mar. 28, 1961

2,977,251

PROTECTIVE COATING METHODS AND MATERIALS

John V. Long, San Diego, and John V. Furth, La Jolla, Calif., assignors to Solar Aircraft Company, San Diego, Calif., a corporation of California No Drawing. Filed Nov. 21, 1956, Ser. No. 623,550

22 Claims. (Cl. 111—160)

The present invention relates generally to protective coatings, methods, and materials. More specifically, it is directed to low firing ceramic-aluminum cermet coatings for protecting metals, metallic alloys and certain non-metallics, and to novel methods and frits and slips for producing these coatings.

This application is a continuation in part of our copending application Serial Number 512,315, filed May 31, 1955, now Patent No. 2,900,276.

In our copending application S.N. 512,315, we disclose aluminum-ceramic cermet coatings including ceramic components, which contribute refractoriness, high temperature strength, and chemical and physical stability at high temperatures, and aluminum components which contribute ductility and high resistance to erosion and thermal and mechanical shock. We also disclose therein a method of providing an article with a ceramic-aluminum cermet coating by an inexpensive production process comprising the steps of applying and firing on the article to be coated a slip composed of a water vehicle, aluminum or aluminum alloy powder, a suspension agent and binder, and a ceramic frit which forms the ceramic phase of the end coating and also fluxes the aluminum powder and coated surface during the firing cycle.

The coatings disclosed in our copending application S.N. 512,315 are fired at a minimum temperature of about 1350° F. These coatings are being used successfully in a large number of applications, on such metals as mild steels, stainless steels, and the super alloys like N–155, Inconel and other high chromium-nickel based alloys. However, when certain alloys and/or non-metallics are to be coated, it is desirable to provide a coating which fires at temperatures lower than the 1350° F. recited in our copending application. For example, the chromium-molybdenum-vanadium alloys, including but not limited to Timken 1722 A(S) and General Electric "Chromoloy," are worked in the annealed state; and the finished part is normalized at about 1750° F., then tempered at 1250° F. for from two to six hours. If subsequent to the tempering operation, a coating were applied and fired at 1350° F., or higher, the work piece might be deleteriously affected.

Therefore, when alloys like Timken 1722 A(S) are to be coated, it is necessary to provide a coating which fires at a temperature not above the tempering point, and preferably fires at about 1250° F.

It is therefore the primary object of the present invention to provide novel ceramic aluminum protective cermet coatings which fire in a range of from 1240° F. to 1250° F.

It is also an object of this invention to attain the objectives and improved results in aluminum-ceramic cermet coating as set forth in our copending application S.N. 512,315.

As in the case of the coatings of our copending application, S.N. 512,315, our present coatings are similarly obtained by applying to the work piece a water vehicle slip including a mixture of aluminum powder and a ceramic frit that includes boron oxide plus an aluminum-water reaction inhibitor, and firing the part in the desired temperature range, in a gas or electric furnace with an air atmosphere.

In preparing our slip, we first combine in parts by weight 10–20 parts beryllia (BeO), 30–62 parts lithium carbonate ($Li_2CO_3$), and 130–140 parts boric acid ($H_3BO_3$). This mixture is smelted at approximately 2000° F. from 30 to 45 minutes until a clear bubble-free condition obtains. During the smelting operation, the lithium carbonate releases carbon dioxide ($CO_2$) and becomes lithia ($Li_2O$), and the boric acid releases water ($H_2O$) and becomes boron oxide ($B_2O_3$). The final smelt, therefore, contains by weight 10–20 parts beryllia, 15–25 parts lithia, and 65–70 parts boron oxide. The preferred ratio is 15 parts BeO, 20 parts $Li_2O$, and 65 parts $B_2O_3$.

This smelt then is fritted as by pouring into cold water, and the frit is dry milled to a preferred fineness of —200 mesh.

From 50 to 20 parts by weight of frit are now mixed with 50 to 80 parts aluminum powder preferably of —200 mesh fineness, 5–10 parts ball type clay and 50–60 parts water to form the slip. The preferred slip comprises 30 parts frit, 70 parts aluminum, 10 parts clay and sufficient water to produce a slip of the desired fluidity, depending on the method of applying the slip.

While in general we prefer to utilize comparatively pure aluminum in our coatings, we can use alloys of aluminum and silicon, aluminum and copper, and others of the aluminum alloys.

The work piece should be reasonably free of grease and oil but need not be cleaned as by sandblast or acid pickle. The work piece is coated by spraying, dipping, or other like means, and the coat dried to a bisque either at room temperature or in artificial temperature up to 300° F. Thickness of the coat is not critical. We have found that an applied layer of from one to seven mils thick will fire to a satisfactory protective coating of approximately the bisque thickness.

Following the drying cycle, the part is fired at from 1230° F. to 1400° F., and it may be fired in an air atmosphere. Firing need continue only long enough to bring the part to at least 1230° F. and hold it at this temperature for about five minutes. However, a longer firing time will not deleteriously affect the coating, and, for this reason, the part may be tempered and coated during the same cycle. In many cases, the tempering will be carried out prior to final machining where close tolerances must be met, and machining may be carried out subsequent to coating. In some cases, it is preferable to coat the entire work piece, then machine following tempering; while in other cases, the areas to be machined may be masked, and the rest of the work piece coated. Both methods have been used satisfactorily.

In the coating resulting from the above-described process, the beryllia, lithia, and boron oxide combine in a ceramic phase which cooperates with the metallic phase to provide protection from oxidation, corrosion, acid attack, and erosion damage in continuous service temperatures up to 1300° F. for long periods of time, and in temperatures up to 1500° F. for short intermittent periods.

It appears from the evidence available that the components of the frit function as follows: the beryllia stabilizes the final ceramic phase; the lithia stabilizes the boron oxide in the frit so it does not react with the water in the slip; and the boron oxide fluxes both the aluminum powder and the surface of the work piece during the firing cycle. Examination of the applied coating indicates that during firing, some of the aluminum particles diffuse into the surface of the work piece, others melt and combine to form a continuous metallic network throughout the ceramic phase, while some may remain as separate bits embedded in the ceramic. The ceramic phase of our cermet coating acts to plug up the porosity inherent in prior aluminum and aluminum alloy coatings.

We have provided by the foregoing compositions and methods a highly protective ceramic-aluminum coating especially suitable for alloys of the type discussed.

Although our presently disclosed coatings will find wide use in protecting the alloys like those specifically discussed above, this use by no means is the limit of the coatings. For example, these coatings provide highly satisfactory protective layers for graphite, glass, and other non-metallics, and are particularly useful where it is desirable that the piece to be coated not be subjected to high temperatures during processing.

One of the useful applications of our described coating inventions presently in great demand is the sealing of ceramic insulation materials such as woven glass fibers or similar materials, to eliminate porosity and possible oil absorption. The above-disclosed slip is sprayed, dipped, or otherwise applied to the insulating materials, and fired in the indicated temperature range. The result is a structure characterized by little or no porosity, good insulating capabilities and excellent resistance to corrosive and erosive influences.

It will be appreciated that because our present coatings fire at comparatively low temperatures, the process is less expensive than other similar processes, the work piece is subject to less stress, and simpler, cheaper equipment can be used.

The resulting coatings provide protection combining the high temperature strength, refractoriness, and chemical and physical stability of ceramics with the ductility and good resistance to thermal and mechanical shock of metals.

The term "aluminum" when used in the claims means a metal selected from the group consisting of aluminum and aluminum base alloys.

The invention may be embodied in other specific forms without departing from the spirit or essential characteristics thereof. The present embodiments are therefore to be considered in all forms as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of providing the surface of an article with an aluminum cermet coating having both ceramic and metallic phases, which includes the steps of: applying to the surface to be coated a slip comprising a liquid vehicle having suspended therein a cermet composition including a metallic constituent from the group consisting of aluminum and aluminum base alloys in particle form, a smelted and fritted ceramic borate frit constituent consisting essentially of a major amount of boron oxide plus beryllia and lithia, and a suspension agent; and firing the article surface at a temperature of about 1230° F. to 1400° F. to form a cermet coating on said surface.

2. The method defined in claim 1 wherein said article surface is fired at a temperature between about 1230° F. and 1250° F.

3. A method as defined in claim 1 wherein said suspension agent is a ball type clay.

4. The method defined in claim 1 wherein said liquid vehicle is water.

5. The method defined in claim 1 comprising from 50 to 80 parts by weight of said metallic constituent and from 50 to 20 parts by weight of said smelted and fritted ceramic borate frit constituent.

6. The method defined in claim 1 wherein the ceramic frit comprises approximately 10–20 parts beryllia, 15–25 parts lithia, and 65–70 parts boron oxide, in parts by weight.

7. The method defined in claim 6 wherein said ceramic frit constituent includes approximately 65 parts boron oxide, 15 parts beryllia and 20 parts lithia, in parts by weight.

8. As an article of manufacture, a body including a surface having bonded thereto an aluminum-ceramic cermet coating comprising approximately 50 to 80 parts by weight of a metallic phase selected from the group consisting of aluminum and aluminum base alloys, said metallic phase being interspersed with approximately 50 to 20 parts by weight of a ceramic phase which consists essentially of a smelted and fritted product of a composition of matter consisting essentially of a major amount of boron oxide plus beryllia and lithia.

9. The article of manufacture of claim 8 wherein said ceramic phase consists essentially of the smelted and fritted product of a composition of matter consisting essentially of approximately 65 to 70 parts boron oxide, 10 to 20 parts beryllia and 15 to 25 parts lithia, in parts by weight.

10. The method of providing the surface of an article with a cermet coating having both metallic and ceramic phases, which comprises the steps of: applying to the surface to be coated a slip composed of a liquid vehicle, a suspension agent, 50 to 80 parts by weight in the aggregate of a metal selected from the group consisting of aluminum and aluminum base alloys in particle form, and from 50 to 20 parts by weight in the aggregate of a frit consisting essentially of from 65 to 70 parts by weight boron oxide, from 10 to 20 parts by weight beryllia, and from 15 to 25 parts by weight lithia; and firing said slip-coated surface at a temperature between about 1230° and 1400° F.

11. The method defined in claim 10 wherein said article surface is fired at a temperature between about 1230° and 1250° F.

12. A method as defined in claim 10 wherein said coating is fired in an air atmosphere.

13. A cermet coating slip comprising: from 50 to 80 parts by weight of a metal selected from the group consisting of aluminum and aluminum base alloys in particle form; from 50 to 20 parts by weight of the smelted and fritted product of a composition consisting essentially of a major amount of boron oxide plus beryllia, and lithia; from 5–10 parts by weight suspension agent; and a liquid vehicle in sufficient quantity to produce a slip of desired fluidity for coating articles.

14. A slip as defined in claim 13, wherein said liquid vehicle is water.

15. A slip as defined in claim 13, wherein said suspension agent is a ball type clay.

16. A slip as defined in claim 15 consisting of approximately 30 parts frit, 70 parts metal powder, and 10 parts clay, in parts by weight.

17. A cermet coating slip as defined in claim 13, wherein said smelted and fritted product is of a composition consisting essentially of approximately 65–70 parts boron oxide, 10–20 parts beryllia, and 15–25 parts lithia, in parts by weight.

18. A smelted and fritted composition of matter consisting essentially of approximately 65 to 70 parts boron oxide, 10 to 20 parts beryllia, and 15 to 25 parts lithia, in parts by weight.

19. A frit as defined in claim 18 consisting essentially of about 65 parts boron oxide, 20 parts lithia and 15 parts beryllia, in parts by weight.

20. A cermet coating slip comprising: a liquid vehicle; a suspension agent; a metal selected from the group consisting of aluminum and aluminum base alloys in particle form; and the smelted and fritted product of a composition consisting essentially of a major portion of boron oxide plus beryllia and lithia.

21. The cermet coating slip of claim 20 comprising from 50 to 80 parts by weight of said metal and from 50 to 20 parts by weight of said smelted and fritted product.

22. The cermet coating slip of claim 20 wherein said smelted and fritted product is of a composition consisting essentially of approximately 65 to 70 parts boron oxide, 10 to 20 parts beryllia, and 15 to 25 parts lithia, in parts by weight.

References Cited in the file of this patent

UNITED STATES PATENTS

| | | |
|---|---|---|
| 1,856,303 | White | May 3, 1932 |
| 1,961,603 | Berger | June 5, 1934 |
| 2,249,007 | Kinzie et al. | July 15, 1941 |
| 2,511,679 | Thiess | June 13, 1950 |
| 2,573,200 | Hushley | Oct. 30, 1951 |
| 2,711,975 | Wainer et al. | June 28, 1955 |
| 2,775,531 | Montgomery et al. | Dec. 25, 1956 |

FOREIGN PATENTS

| | | |
|---|---|---|
| 656,503 | Great Britain | Aug. 22, 1951 |
| 712,082 | Great Britain | July 14, 1954 |

OTHER REFERENCES

Metal Finishing, vol. 50, No. 10; October 1952, page 61.